Aug. 19, 1952     C. J. OVERMYER ET AL     2,607,122
LIQUID-MEASURING DEVICE
Filed July 31, 1950     4 Sheets-Sheet 1
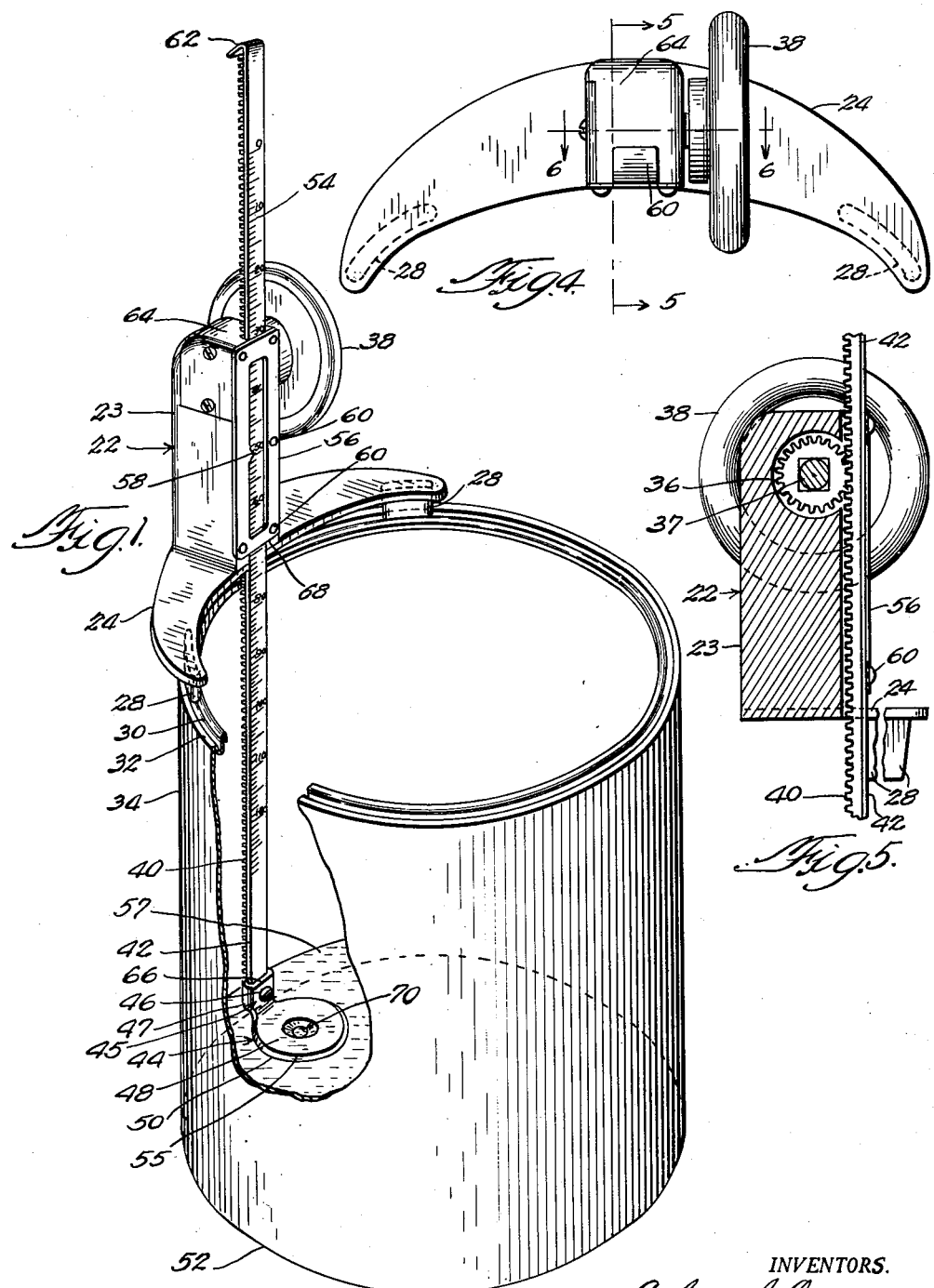
INVENTORS.
Calvin J. Overmyer
Willard E. Giese &
Howard F. Weckel.
By Thiess, Olson & Mecklenburger
Attys.

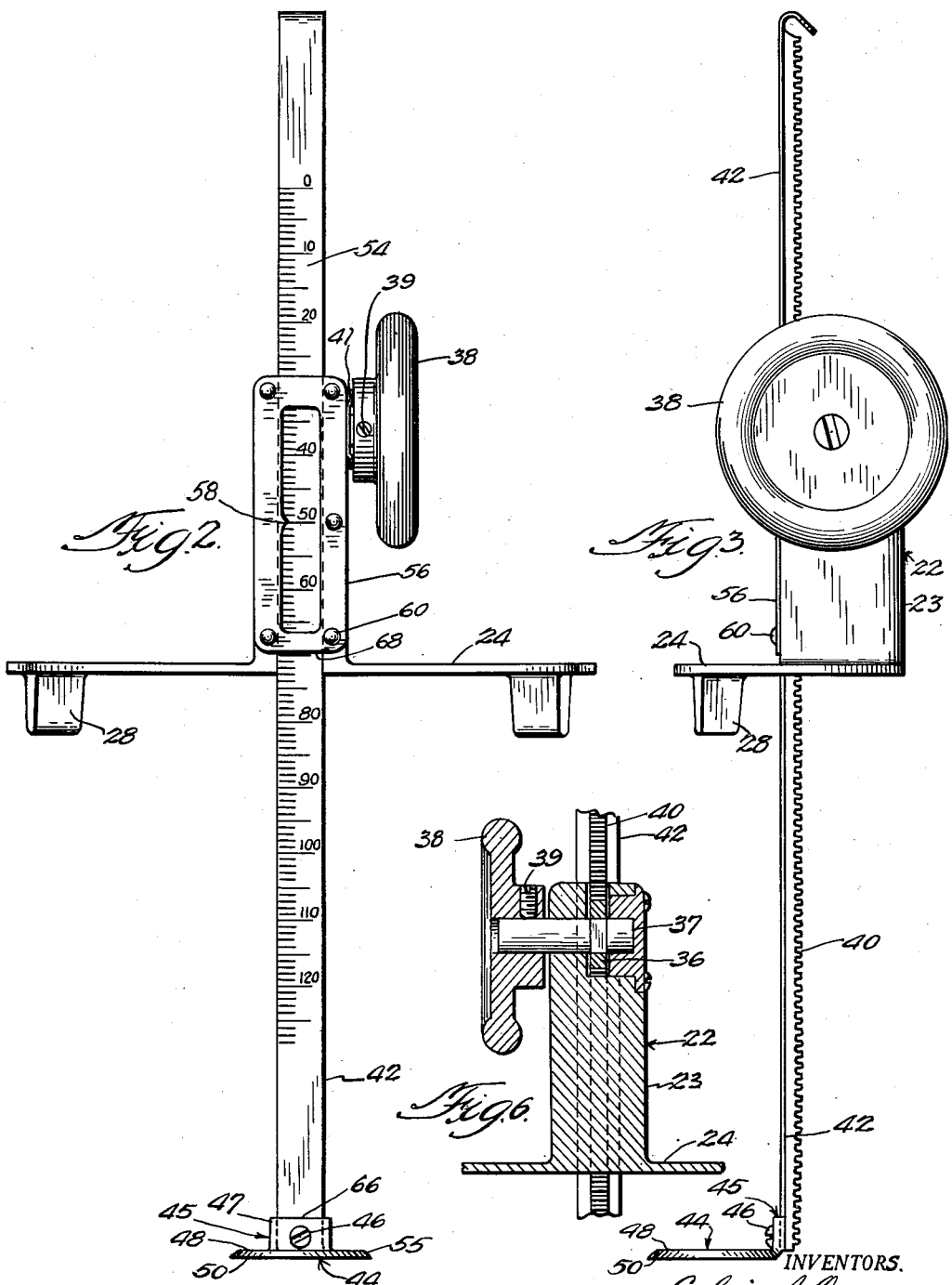

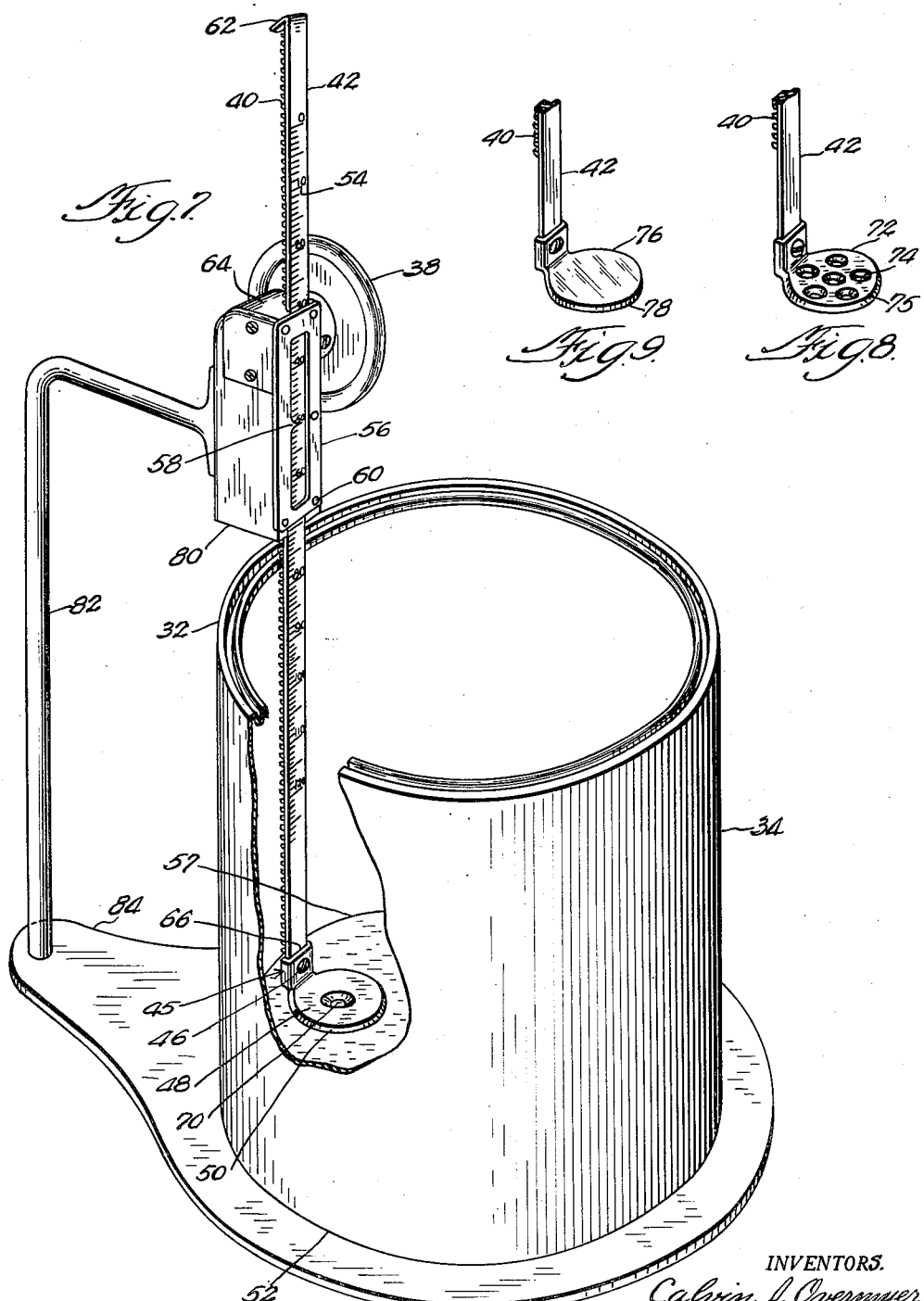

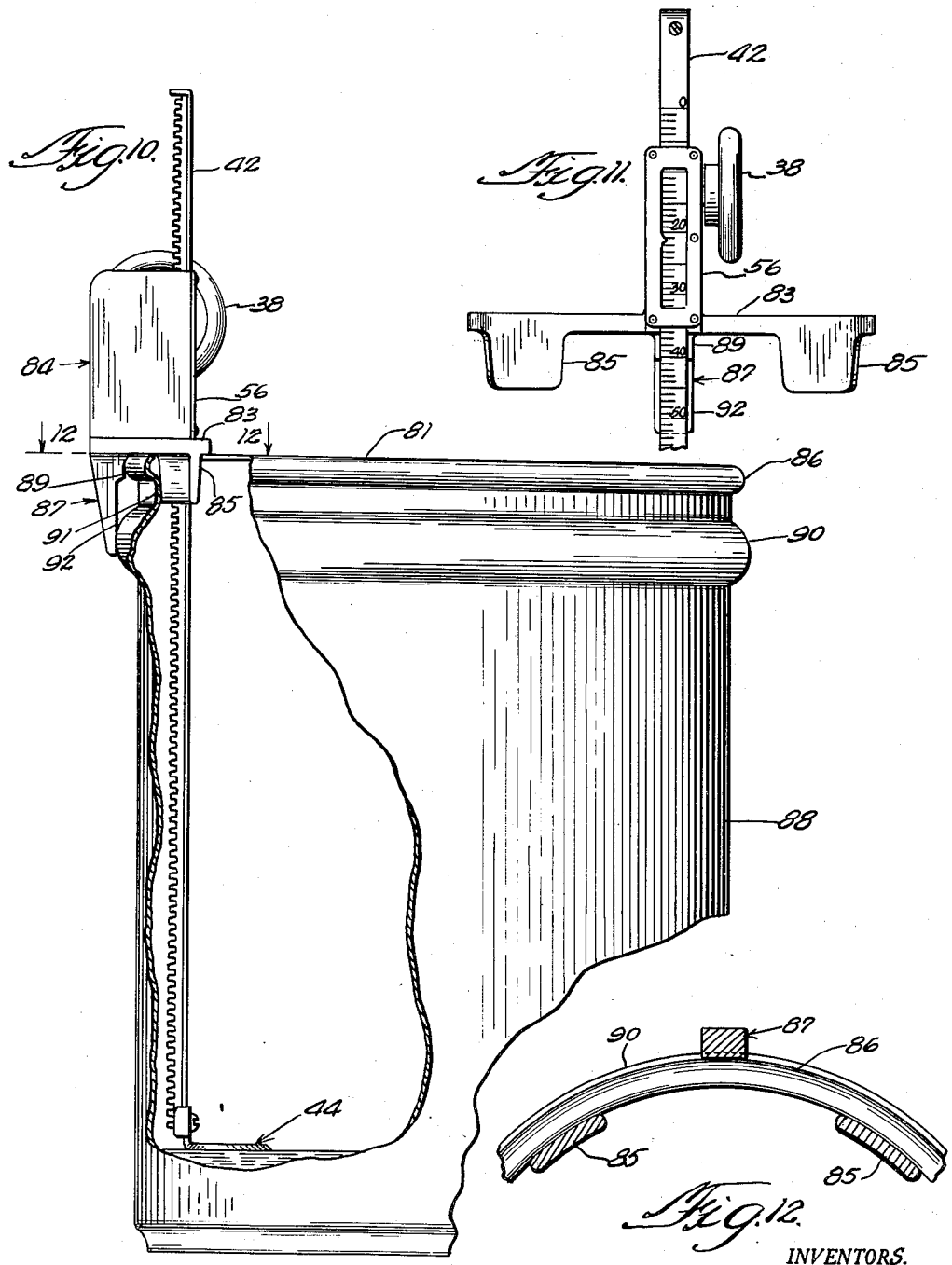

Patented Aug. 19, 1952

2,607,122

UNITED STATES PATENT OFFICE 2,607,122

LIQUID-MEASURING DEVICE

Calvin J. Overmyer, Oak Park, and Willard E. Giese and Howard F. Weckel, Chicago, Ill., assignors to Elliott Paint & Varnish Co., Chicago, Ill., a corporation of Illinois Application July 31, 1950, Serial No. 176,812

5 Claims. (Cl. 33—126.7)

This invention relates to liquid-measuring devices and more particularly to devices of this character by means of which predetermined portions of various liquids may be accurately measured in a mixing container to insure a desired proportion of each ingredient in the resultant mixture.

While our invention may be used in accurately determining the proportions of ingredients of any type of liquid mixture, the embodiments of our invention disclosed hereinafter are especially adapted to be used by paint dealers in mixing paints of any desired color for customers.

The average retail paint dealer is usually unable to carry in stock all the various colors of paint which are desired by customers either for original painting purposes or for touching up objects already painted. To meet this situation paint manufacturers may provide their dealers with color charts to facilitate the matching of colors. The chart itself, or printed material supplemental thereto, may provide instructions as to the proportions of various standard colors which when combined provide a mixture of the desired shade or color.

In following these instructions, however, difficulty is frequently experienced in accurately measuring the exact proportion of each ingredient of the ultimate mixture. Failure to attain the accuracy desired usually produces a resultant mixture which is slightly off-color and thus unsatisfactory to the purchaser of the final product, especially when it is to be employed for repair purposes such as, for example, touching up the paint on furniture, automobiles, or other objects.

It is an object of this invention, therefore, to provide a liquid measuring device which can be conveniently employed to measure accurately the proportions of the various ingredients to be combined to provide a resultant mixture of a desired predetermined constituency.

It is a further object of this invention to provide a paint-measuring device which may be conveniently employed to measure accurately the proportions of ingredients to be combined to produce a resultant paint mixture of a desired predetermined color or shade.

It is a still further object of this invention to provide a paint-measuring device which may be conveniently employed in connection with an ordinary paint receptacle to accurately measure the proportions of ingredients in the resultant paint mixture.

Further objects and advantages of this invention will become apparent from the following description taken in connection with the accompanying drawings and appended claims.

In carrying out this invention in one form there is provided a liquid-measuring device comprising a frame having a vertical portion adapted to be positioned in fixed relation adjacent the rim of an open top container and a horizontal portion adapted to rest on said rim, said horizontal portion including a pair of downwardly extending arcuate bosses adapted to be received in a circumferential recess in said rim, an elongated element mounted on said frame for vertical adjustment relative thereto and projecting downwardly into said container, means for reciprocating said elongated element relative to said frame, a rigid plate or disc secured to the lower end of said elongated element and having its lower surface parallel to the bottom of said container, and means comprising indicia on said elongated element cooperative with an indicator on said frame for determining the height of said surface from the bottom of said container.

In accordance with a further embodiment of this invention the liquid-measuring device comprises a frame, a base for supporting a liquid receptacle or container, and a stanchion extending upwardly from said base for securing said frame in a fixed relation adjacent the rim of the container.

In accordance with a still further embodiment of this invention, the liquid-measuring device comprises a frame having a horizontal portion adapted to rest on the rim of an open top container, said horizontal portion including a pair of downwardly extending arcuate bosses for embracing the wall of said container on the inside thereof and another downwardly extending arcuate boss for embracing said wall on the outside thereof.

For a more complete understanding of this invention reference will be made to the accompanying drawings, wherein Fig. 1 is a perspective view of one embodiment of applicants' invention showing its relationship to a paint can which is partially broken away;

Fig. 2 is a front elevational view of the device shown in Fig. 1;

Fig. 3 is a side elevational view of the device;

Fig. 4 is a plan view of the device;

Fig. 5 is a sectional view taken along line 5—5 in Fig. 4;

Fig. 6 is a sectional view taken along line 6—6 in Fig. 4;

Fig. 7 is a perspective view of a modified form of applicants' invention showing its relationship to a paint can which is partially broken away;

Fig. 8 is a perspective view of a modified form of a certain component of applicants' invention;

Fig. 9 is a perspective view of another modified form of a certain component of applicants' invention;

Fig. 10 is a perspective view partially broken away of a modified form of another component of applicants' invention;

Fig. 11 is a partial front elevational view of the modification shown in Fig. 10; and Fig. 12 is a partial sectional view taken in the direction of arrows 12—12 in Fig. 10.

With particular reference to Fig. 1 there is provided a frame 22 having a vertical portion 23 and a horizontal portion or arm 24 integral therewith. Arm 24 is provided with a pair of arcuate bosses 28 extending downwardly therefrom and adapted to be received in the annular recess 30 provided in the upper rim 32 of an ordinary paint can 34. By means of the bosses 28 the arm 24 is prevented from falling off the rim 32 upon which the arm normally rests when the device is in use.

Referring to Fig. 5, frame 22 houses a pinion 36 secured to shaft 37 and operable by means of a control knob 38. The control knob is secured to the shaft by a set screw 39 and is biased away from the frame by a leaf spring 41 (Fig. 2). The pinion is engageable with a rack 40 secured to an elongated element 42 which is extendable vertically into the interior of the can 34. As shown in Figs. 1 and 2, a rigid plate or disc 44 including a bracket portion 45 is secured to the bottom of element 42 by means of a screw 46. Bracket 45 includes a pair of flanges 47 for embracing element 42 whereby the upper and lower flat surfaces 48 and 50 of the disc, respectively, are maintained parallel to the bottom 52 of the can.

The vertical element 42 is provided with indicia 54 which may be uniformly spaced markings from 0 to 128 to represent, for example, the number of ounces in a one-gallon can. A plate 56 having a pointer or indicator 58 thereon is secured to the front of the frame by means of screws 60. By turning control knob 38 vertical element 42 may be reciprocated relative to the pointer 58 between the 0 and 128 markings, the bent-over finger 62 (Fig. 1) at the upper end of element 42 serving to locate and stop element 52 with the pointer 58 opposite the 0 marking when finger 62 contacts the top 64 of the frame, and the upwardly bent portion 66 of plate 44 serving to stop and limit element 42 with the pointer opposite the 128 marking when it contacts the lower edge 68 of plate 56. When the pointer is opposite the 0 marking the lower surface 50 of plate 44 rests on the bottom of the can and when the pointer is opposite the 128 marking the lower surface of the plate parallels and just contacts the surface of a full gallon (not shown) of paint in a can. As illustrated in Fig. 1, where the pointer 58 is shown opposite the 50 marking on the vertical element, the lower surface 50 of plate 44 is parallel with and just contacts the surface 57 of 50 ounces of paint in the can.

Plate 44 is provided with a centrally located aperture 70 beveled downwardly ad radially inwardly completely through the plate. The periphery 55 (Fig. 1) of the plate is beveled downwardly and radially outwardly whereby the upper surface 48 of the plate is rendered slightly smaller in area than the lower surface 50. When using applicants' device the height of the plate 44 above the bottom of the can is first adjusted by turning the knob 38 until the pointer 58 is opposite the marking on vertical element 42 indicative of the number of ounces, for example, of the first paint ingredient that is to be used to prepare the final desired mixture. This ingredient is then poured into the can until the surface of this ingredient just contacts the lower surface 50 of the plate 44. Contact of the paint with surface 50 is indicated by the appearance in aperture 70 of a blister of paint (not shown) which increases in size as the paint commences to rise in the aperture, and by the apparent decrease in size of plate 44 as the paint gradually rises on the beveled periphery 55. Second and subsequent ingredients may be added and similarly admitted into the can or mixing receptacle in a predetermined amount and proportion by raising and resetting element 42 according to mixing instructions and again adding the ingredients until the surface of the mixture again contacts the lower surface 50 of plate 44.

It will be understood, of course, that the indicia or markings on element 42 are somewhat arbitrary and may be changed, for example, if it is desired to use the device with mixing receptacles of smaller or larger size than one gallon. However, the same markings may be used as disclosed in Fig. 1, if the paint mixing instructions which may be provided are given for smaller or larger size container quantities. Also, if the instructions for mixing are given for a fixed mixture quantity the operator himself may interpret the instructions so as to conform them to the size of the container to be used.

Referring to Fig. 8, there is shown a modified form of rigid plate 72 which is provided with a plurality of beveled apertures 74 therethrough, these apertures serving the same purpose in cooperation with the beveled periphery 75 of the plate 72 as hereinbefore described.

Fig. 9 discloses a further modification in that the rigid plate 76 is formed of translucent material, which may be plastic. Contact of the surface of paint with the lower surface 78 of plate 76 is indicated by a substantial change in appearance of the plate caused by changes in the reflection of light from the surface of the paint therethrough.

Referring to Fig. 7, there is provided a further modified form of applicants' invention wherein the frame 80 is secured adjacent the upper rim 32 of the paint can by means of a supporting stanchion 82 secured to and extending upwardly from a base 84 which may also be used to support the paint can. The device disclosed in this embodiment, except for the manner of supporting the frame 80, is substantially the same in design and operation as the device disclosed in Fig. 1.

Referring to Figs. 10, 11, and 12, there is shown a still further modification of applicants' invention which is adapted for use with paint receptacles of larger size than those shown in Figs. 1 and 2. For example, five-gallon paint cans, such as the can 88 (Fig. 10), are usually provided with a pair of annular bulges, 86 and 90, in the upper portion thereof, the upper bulge 86 adjacent the rim 81 being somewhat smaller in diameter than the lower bulge 90. To secure applicants' liquid-measuring device to this type of can, the horizontal portion 83 of the frame 84 is provided outwardly thereon with a pair of downwardly extending arcuate bosses 85 adapted to embrace the inner side of portion 91 of the can between the bulges. Centrally of the horizontal portion 83 there is provided thereon a longer downwardly extending boss 87 having an upper arcuate inner surface 89 for embracing the upper bulge 86 and a lower arcuate inner surface 92 for embracing the lower bulge 90 whereby the frame is supported on the can with the horizontal portion 83 thereof resting on the rim 81 of the can. The device disclosed in this embodiment, except for the manner of supporting the frame, is also substantially the same in design and operation as the device disclosed in Fig. 1.

It will be apparent from the foregoing that many changes and modifications may be made in the structure described in the foregoing without departing from the spirit and scope of this invention. While several embodiments are disclosed above it will be understood, of course, that the invention is not to be limited thereto since many modifications may be made and it is contemplated, therefore, by the appended claims, to cover any such modifications as fall within the true spirit and scope of this invention.

We claim:

1. A device for determining the quantity of liquid in an open top container of known capacity, comprising a frame adapted to be positioned in fixed relation adjacent the rim of said container, an elongated element mounted on said frame for vertical adjustment relative thereto and projecting downwardly into said container, means for reciprocating said elongated element relative to said frame, and a rigid plate secured to the lower end of said elongated element and having its lower surface normally parallel to the surface of said liquid, said plate comprising a beveled aperture and a beveled periphery for visually detecting contact of said liquid therewith.

2. A device for determining the quantity of liquid in an open top container of known capacity, comprising a frame adapted to be positioned in fixed relation adjacent the rim of said container, an elongated element mounted on said frame for vertical adjustment relative thereto and projecting downwardly into said container, means for reciprocating said elongated element relative to said frame, and a rigid plate secured to the lower end of said elongated element and having its lower surface normally parallel to the surface of said liquid, said plate comprising a beveled aperture for visually detecting contact of said liquid therewith.

3. A device for determining the quantity of liquid in an open top container of known capacity, comprising a frame adapted to be positioned in fixed relation adjacent the rim of said container, said frame including a horizontal portion adapted to rest on said rim, a pair of downwardly extending bosses secured to said horizontal portion and adapted to be received in a circumferential recess in said rim, an elongated element mounted on said frame for vertical adjustment relative thereto and projecting downwardly into said container, means for reciprocating said elongated element relative to said frame, and a rigid plate secured to the lower end of said elongated element and having its lower surface normally parallel to the surface of said liquid, said plate comprising a beveled aperture for visually detecting contact of said liquid therewith.

4. A device for determining the quantity of liquid in an open top container of known capacity, comprising a frame, a base for supporting said container, a stanchion extending upwardly from said base for securing said frame in fixed relation adjacent the rim of said container, an elongated element mounted on said frame for vertical adjustment relative thereto and projecting downwardly into said container, means for reciprocating said elongated element relative to said frame, and a rigid plate secured to the lower end of said elongated element and having its lower surface normally parallel to the surface of said liquid, said plate comprising a beveled aperture for visually detecting contact of said liquid therewith.

5. A device for determining the quantity of liquid in an open top container of known capacity and having inner and outer wall portions adjacent the rim thereof, comprising a frame adapted to be positioned in fixed relation overlying said rim, said frame including a horizontal portion adapted to rest on said rim, a pair of downwardly extending arcuate bosses secured to said horizontal portion and adapted to embrace said inner and outer wall portions, an elongated element mounted on said frame for vertical adjustment relative thereto and projecting downwardly into said container, means for reciprocating said elongated element relative to said frame, and a rigid plate secured to the lower end of said elongated element and having its lower surface normally parallel to the surface of said liquid, said plate comprising a beveled aperture and a beveled periphery for visually detecting contact of said liquid therewith.

CALVIN J. OVERMYER.
WILLARD E. GIESE.
HOWARD F. WECKEL.

REFERENCES CITED

The following references are of record in the file of this patent:

UNITED STATES PATENTS

| Number | Name | Date |
| --- | --- | --- |
| 1,378,536 | Flynn | May 17, 1921 |
| 2,098,963 | Hexter | Nov. 16, 1937 |
| 2,127,042 | Morrell | Aug. 16, 1938 |
| 2,169,952 | Holmes | Aug. 15, 1939 |
| 2,213,026 | Hoffman | Aug. 27, 1940 |
| 2,237,443 | Marienthal | Apr. 8, 1941 |
| 2,253,992 | Verduzco | Aug. 26, 1941 |
| 2,269,737 | Rogers | Jan. 13, 1942 |